H. C. HANSEN.
MACHINE FOR MAKING WOODEN LATTICEWORK FOR PLASTERING.
APPLICATION FILED AUG. 25, 1913.

1,121,497.

Patented Dec. 15, 1914.
4 SHEETS—SHEET 1.

H. C. HANSEN.
MACHINE FOR MAKING WOODEN LATTICEWORK FOR PLASTERING.
APPLICATION FILED AUG. 25, 1913.

1,121,497.

Patented Dec. 15, 1914.

Witnesses:
A. G. Dolan
B. R. Goodrich

Inventor:
Hans Claussen Hansen
by B. Singer
Attorney

UNITED STATES PATENT OFFICE.

HANS CLAUSSON HANSEN, OF CHRISTIANIA, NORWAY, ASSIGNOR TO GUDBRAND KJEKSTAD, OF ROKEN, NORWAY, AND KRISTIAN STENSRUD, OF CHRISTIANIA, NORWAY.

MACHINE FOR MAKING WOODEN LATTICEWORK FOR PLASTERING.

1,121,497.   Specification of Letters Patent.   Patented Dec. 15, 1914.

Application filed August 25, 1913. Serial No. 786,608.

*To all whom it may concern:*

Be it known that I, HANS CLAUSSON HANSEN, a subject of the King of Norway, and a resident of the city of Christiania, Norway, manager, have invented a new and useful Improvement in Machines for Making Wooden Latticework for Plastering, of which the following is a specification.

The object of this invention is a machine for making wooden latticework for plastering, a kind of plastering cloth. It is true that machines for similar purposes have previously been known, but they work in such wise that the laths to be woven into the "cloth" must be inserted from the side of the machine between all the bearing and binding wires or strings. To insert these thin and fragile laths from the side of the machine is a very difficult and slow process, which reduces the outputting capacity of the machine. Moreover the machines hitherto known act by always whipping the binding wire or string around the bearing wires and laths in the same direction. This involves the binding wire passing at an angle over the laths, which makes their attachment to the bearing wire less firm and secure than it should be, and thus the product is not as good as it otherwise might be.

The object of this present invention is, that the "weaving" can be done with the laths lying with their full length right across all the bearing wires and the laths are brought up by arms to the part of the machine where their fastening to the bearing wires takes place. This is rendered possible by the laths being laid on an automatically sinkable frame, over which all the bearing wires, in a tightly stretched condition, fit into the machine, and together with the laths are automatically raised up into the position in which the fastening by the binding wires takes place. And further, the machine works in such wise that the binding wires whip around the laths and bearing wires alternately with right and left turns, whereby the wire is carried over the laths perpendicular to their axis, thus insuring a firm attachment of the laths to the bearing wires, so that they cannot slip when they are being covered with plaster, and thus cracks in the surface of the plaster are obviated.

An example of one form for such a machine is shown on the accompanying drawings.

Figure 1:
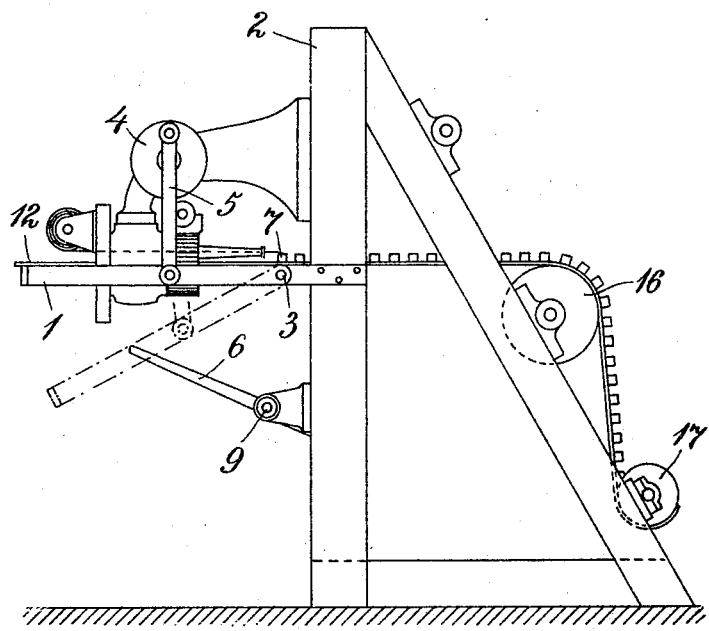
Figure 2:
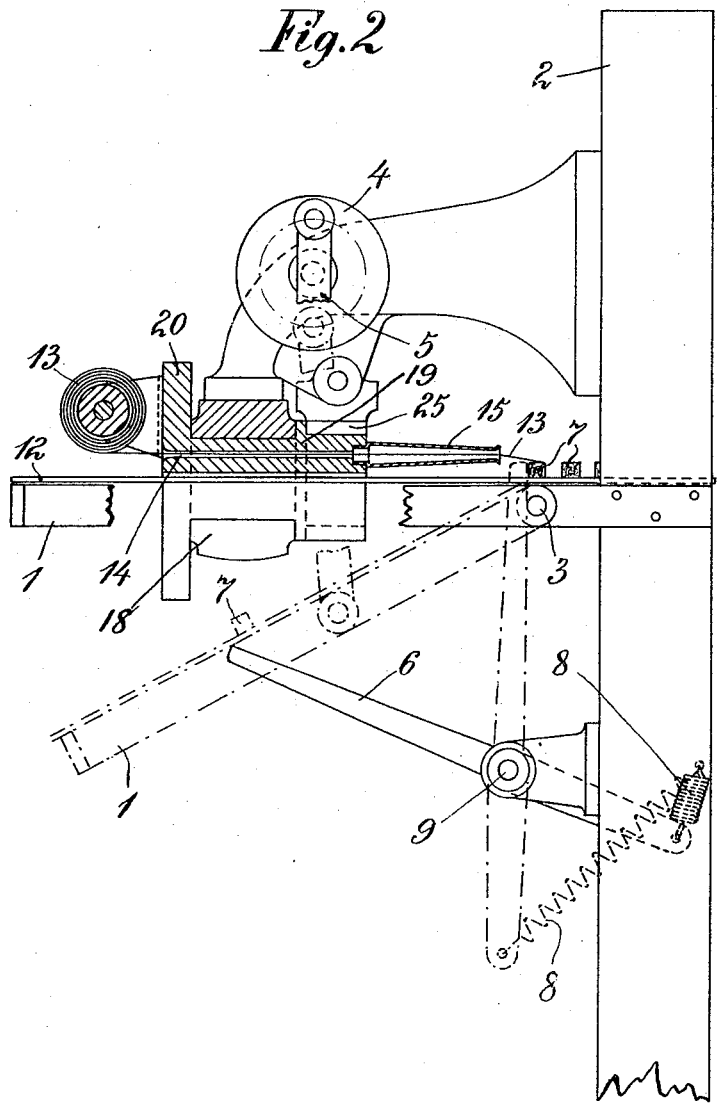
Figure 3:
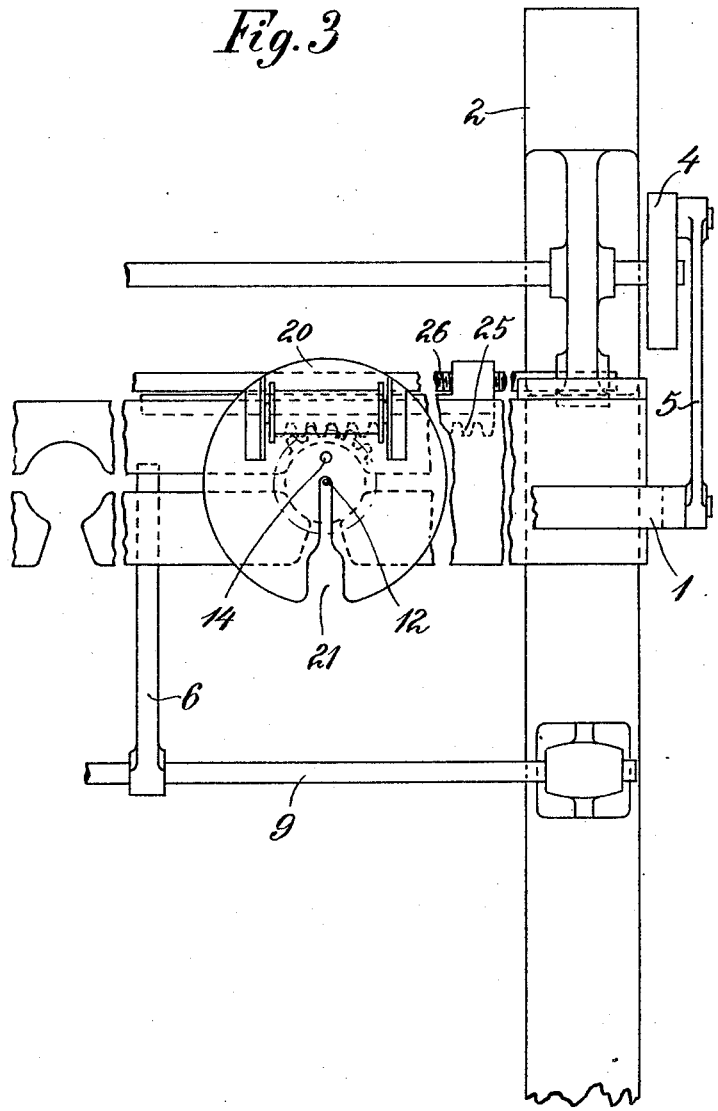
Figure 4:
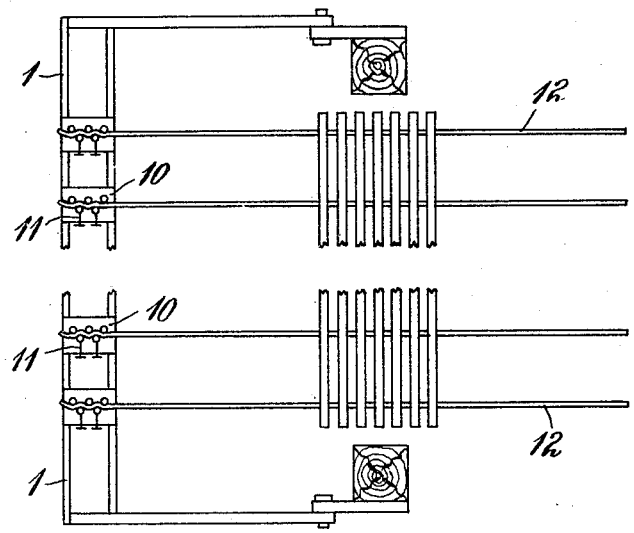
Figure 5:
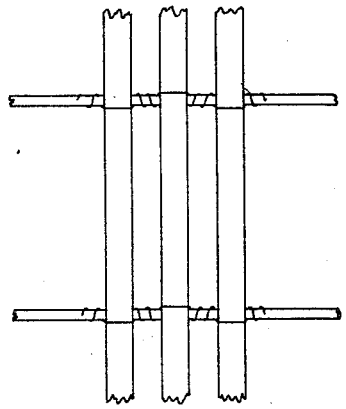

Figure 1 shows the machine seen from one of the sides. Fig. 2 shows on an enlarged scale the whipping apparatus of the machine, seen from one side with the lowerable frame in the position it takes when the whipping with the binding wire is about to take place. Fig. 3 shows the same, seen from the front, with the frame in the same position. Fig. 4 shows the lowerable frame seen from above. Fig. 5 shows the binding wire whipped around the laths and bearing wires.

The special novelty in this machine consists of the lowerable frame 1, which is connected with the upright frame 2, by a suitable hinge 3. By means of the crank pulley 4 which is actuated by the driving shaft of the machine, and by the rod 5, this frame can be automatically lowered and raised. In Fig. 2, the frame is shown in dotted lines in depressed position.

6 is an arm which brings the laths 7, that are placed on the bearing wires, up to the position in which their being whipped on by the binding wire is effected. Several arms are provided which are fixed, at suitable distances, to the axle 9, which is turned by a lever system, worked by the machine operator by means of a pedal that is not shown on the drawing. The arms 6 are returned to their original, inoperative position by means of springs 8.

The bearing wires 12 are led into the machine over the frame 1, and are tightened between ordinary holders 10, by the adjustable stretching screws 11. When the frame is depressed, the lath 7 is placed on the bearing wire 12, which goes over the frame, and on raising the frame, the lath 7 is conveyed by the arms 6 to the place where the fastening on takes place by the binding wire 13.

The whipping by the binding wire is done by the whipping apparatus 19, which is journaled in a bearing 18 and is furnished with a toothed portion and has a slit 21, going to the center. When the frame has been brought up into a horizontal position, the bearing wire will then be in the center of the apparatus. At the back plate 20 of the whipping apparatus, there is a reel placed in the ordinary manner, on which the binding wire 13 is coiled, and which wire runs through a channel 14, which leads to the guiding tube 15 which has a funnel-shaped mouth.

The whipping by the binding wire is done by means of the rack-bar 25, which is operated by the screw 26, the longitudinal displacement of the rack bar 25 being effected by rotation of the screw, so that the apparatus, with the binding wire, makes three or more turns. When the lath is fastened to the bearing wire by the whipping apparatus, the "cloth" is fed forward in a well-known manner by means of the toothed roller 16, which is given a step-by-step revolving motion by means of a ratchet-wheel mechanism, not shown on the drawings, by which the "cloth" is carried forward to such distance as that which it is desired to have between the laths. The finished "cloth" is wound up on a drum 17. Meanwhile the frame has again been depressed, and upon it another lath is placed, which is conveyed to the fastening apparatus and is fastened to the bearing wires by the rack bar 25 as it goes back. It will thus always whip on the binding wire in the opposite direction to the previous one, and thus in such wise that the bindings will alternately be in opposite directions, whereby the binding wire will always pass straight over the lath perpendicular to its axis.

Having now described my invention, what I claim is:

1. In a machine for connecting longitudinal supporting wire with lath, a twisting apparatus, a holder for the supporting wire, and means for alternately bringing the said holder into operative and inoperative position with respect to the twisting apparatus.

2. In a machine of the character described, the combination of a holder for longitudinal supporting wires, a twisting apparatus, means for moving the holder in operative and inoperative position with respect to the twisting apparatus, and means for advancing the lath on the holder.

3. In a machine of the character described, the combination of a holder for longitudinal supporting wires, a twisting apparatus, means for moving the holder in operative and inoperative position with respect to the twisting apparatus, and independently operable means for advancing the lath on the holder.

4. In a machine of the character described, a twisting apparatus secured to a stationary part of the machine, a holder for longitudinal supporting wires, and means for raising and lowering said holder alternately into operative and inoperative position with respect to the twisting apparatus.

5. In a machine of the character described, the combination of a twisting apparatus secured to a stationary part of the machine, a holder for longitudinal supporting wires, and independently operable means for conveying lath on the holder into a position in which the twisting apparatus acts on the lath and supporting wire.

6. In a machine of the character described, the combination of a twisting apparatus secured to a stationary part of the machine, a holder for longitudinal supporting wires, and a plurality of oscillatable arms adapted to engage a lath on the holder on a plurality of points and to convey the same to the position where the connection between the lath and supporting wire is effected by the twisting apparatus.

7. In a machine of the character described, the combination of a twisting apparatus, comprising a rotary support for the twisting wire, a holder for the longitudinal supporting wire, and means for moving the supporting wire alternately into and out of the axis of rotation.

8. In a machine of the character described, the combination of a twisting apparatus having a disk, a means for supporting the twisting wire on said disk, a groove in said disk, means for rotating the twisting apparatus about said groove, and means for placing and removing alternately a longitudinal wire into and from said groove.

9. In a machine of the character described, the combination of a twisting apparatus, a holder for longitudinal supporting wire, and means for rotating the twisting apparatus alternately in opposite directions about an axis coinciding with the axis of the supporting wire.

10. In a machine of the character described, the combination of a rotary twisting apparatus secured to a stationary part of the machine, a spool for twisting wire on the apparatus, guiding means for the twisting wire disposed parallel to the axis of rotation of the apparatus, means for alternately bringing a longitudinal supporting wire into the axis of rotation and for removing it therefrom, and independently operable means for advancing a lath in the direction of the supporting wire in the interspace between the twisting wire and the supporting wire.

11. In a machine of the character described, the combination of a rotary twisting apparatus, a gear secured thereto, a rackbar, and means for alternately displacing the rackbar in opposite directions to cause rotation of the twisting apparatus in opposite directions.

12. In a machine of the character described, a rotary twisting apparatus, comprising a gear, a rackbar in engagement with the gear, and a rotary screw-spindle connected with the rackbar and adapted to displace the same longitudinally by rotation of the screw-spindle.

In testimony whereof I affix my signature in presence of two witnesses.

HANS CLAUSSON HANSEN.

Witnesses:
N. G. TAUTBERG,
RUTH LINDSTROM.